United States Patent [19]
Miller

[11] 3,738,107
[45] June 12, 1973

[54] FLOW MIXING SELECTOR VALVE

[75] Inventor: Franklin Elliott Miller, Cincinnati, Ohio

[73] Assignee: General Electric Company, Lynn, Mass.

[22] Filed: Jan. 21, 1972

[21] Appl. No.: 219,764

[52] U.S. Cl. ............... 60/241, 60/39.28, 60/243, 60/261, 137/112, 137/114, 137/602
[51] Int. Cl. ............................................. F02k 3/10
[58] Field of Search ............... 60/39.28, 241, 243, 60/261; 137/602, 111, 112, 114

[56] References Cited
UNITED STATES PATENTS

| | | | |
|---|---|---|---|
| 2,865,166 | 12/1958 | Holbrook | 60/241 |
| 3,433,016 | 3/1969 | Borel | 60/241 X |
| 3,442,218 | 5/1969 | Wess | 60/39.28 R |
| 3,517,679 | 6/1970 | Williamson | 60/39.28 R |

*Primary Examiner*—Clarence R. Gordon
*Attorney*—Edward S. Roman, Derek P. Lawrence, Frank L. Neuhauser et al.

[57] ABSTRACT

A flow mixing selector valve is provided to switch between low and high pressure fluids while maintaining a near constant flow rate of change by providing a brief transition period wherein the high pressure fluid may be gradually commingled with the low pressure fluid in ever increasing proportion until the low pressure fluid can be entirely cut off without unduly stressing components downstream of the mixing valve.

7 Claims, 2 Drawing Figures

PATENTED JUN 12 1973 3,738,107
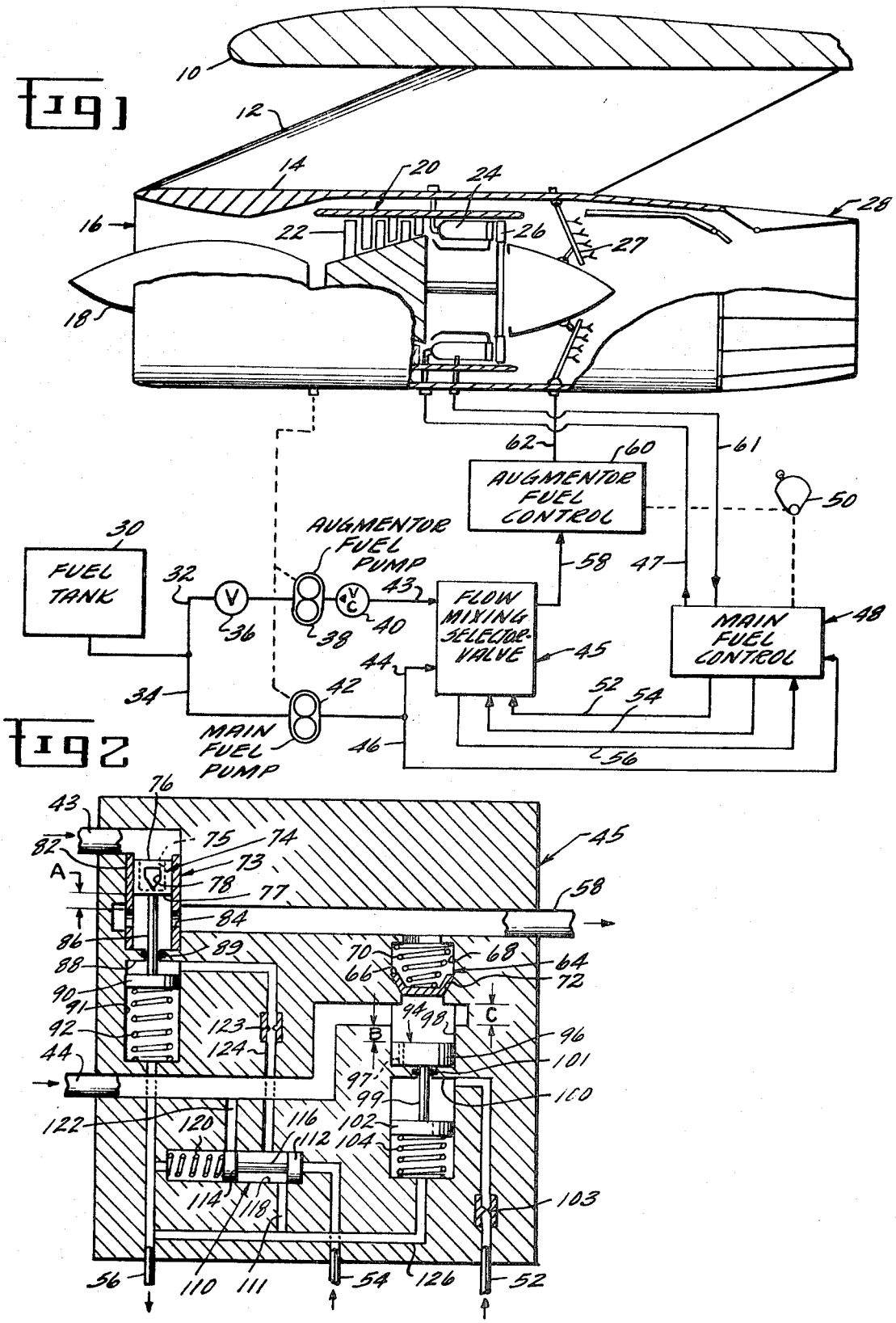

FLOW MIXING SELECTOR VALVE

The invention described and claimed herein resulted from work done under United States Government Contract FA-55-66-6. The United States Government has an irrevocable, non-exclusive license to practice and have practiced the invention claimed herein, including the unlimited right to sublicense others to practice and have practiced the claimed invention for any purpose whatsoever.

BACKGROUND OF THE INVENTION

In general, this invention relates to a flow mixing selector valve and more particularly to a flow mixing selector valve for switching between low and high pressure fluids while maintaining a near constant flow rate of change.

The supersonic transport era will introduce to commercial transport the use of augmentation burning in that gas turbine engines for supersonic transport flight will include an afterburner downstream of the combustor and turbine in which additional fuel will be burned. In order to satisfy the large range of fuel pressures required to sustain the afterburner throughout the various stages of a supersonic flight mission, a minimum of two fuel pumps will likely be required. The main engine fuel pump would supply low pressure fuel to both the combustor and afterburner during high altitude cruise where fuel consumption generally tends to be low, and the low pressure fuel from the main pump is adequate to sustain both the afterburner and main engine combustor. However, during takeoff and low altitude climb, fuel pressure to the afterburners must be greatly increased, for which purpose a high pressure augmentor fuel pump needs to be provided.

Fuel flow cannot be instantly switched between the low pressure main fuel pump and the high pressure augmentor pump because a too rapid introduction of high pressure fuel will operate to overstress the system components, and may also cause adverse engine thrust transients. Fuel control elements and conduits downstream from the high pressure augmentor fuel pump remain sensitive to high fluidic pressure changes precipitated by the rapid opening and closing of a high pressure pump inlet valve. Such a rapid changing of pressures results in what is commonly referred to as the "water hammer effect" which can ultimately damage system components.

Therefore, it is an object of this invention to provide a flow mixing selector valve for switching between low and high pressure fluids while maintaining a low and near constant flow rate of change, that also will not adversely affect the function of the main fuel control.

It is a further object of this invention to provide a flow mixing selector valve which eliminates the "water hammer effect" precipitated by too rapid an introduction of a high pressure fluid by providing a brief transition period wherein the high pressure fluid may be gradually commingled with the low pressure fluid in ever increasing proportion until the low pressure fluid can be entirely cut off, and wherein a low and nearly constant flow rate of change is maintained throughout the transitional period without regard to conditions of inlet flow and pressure.

SUMMARY OF THE INVENTION

A flow mixing selector valve is provided for switching between high and low pressure fluids while maintaining a near constant flow rate of change. The mixing valve comprises a valve housing having a first inlet for receiving a high pressure fluid, a second inlet for receiving a low pressure fluid and an outlet for discharging a fluid. A throttling valve controlled by the low pressure fluid is disposed intermediate the high pressure inlet and discharge outlet for regulating the flow of high pressure fluid therethrough. A check valve is disposed intermediate the low pressure inlet and discharge outlet for regulating the flow of low pressure fluid therethrough. A cutoff valve controlled by an external signal fluid is disposed intermediate the low pressure inlet and check valve for regulating the flow of low pressure fluid to the check valve. A pilot valve also controlled by an external signal fluid is provided for regulating the flow of low pressure fluid to the throttling valve. A low pressure fluid discharge from the mixing valve may be maintained at the mixing valve outlet by directing the externally introduced signal fluid to the cutoff valve which operates to maintain the cutoff valve in the open position, thereby opening the check valve. The mixing valve may be switched to discharge a high pressure fluid from the valve outlet by switching the signal fluid from the cutoff valve to the pilot valve. This operates to allow the flow of low pressure fluid to the throttling valve gradually opening the throttling valve and closing the cutoff valve, allowing a smooth matching of pressures on the discharge conduit and also allowing subsequent closing of the check valve.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a side elevational view partly in cross-section of a gas turbine engine, together with a schematic view of a fuel delivery and control system for the gas turbine engine incorporating the flow mixing valve of this invention.

FIG. 2 is a cross-sectional view of the flow mixing valve of this invention.

DESCRIPTION OF THE PREFERRED EMBODIMENT

FIG. 1 illustrates the installation of a pylon mounted gas turbine engine employing the flow mixing selector valve of this invention. An aircraft wind 10 is shown in connection with a pylon 12 providing the structural connection to a generally cylindrical pod 14. A typical supersonic inlet 16 is formed at the forward end of the pod by an inlet spike 18. The air flows from the inlet 16 to a gas turbine engine 20, which is illustrated as conventionally comprising a compressor 22 for pressurizing air, a combustor 24 wherein the pressurized air supports combustion of fuel to generate a hot gas stream, and a turbine 26 which is driven by the hot gas stream to power the compressor. The hot gas stream is augmented by combustion of fuel in an afterburner or augmentor 27 and then converted to a propulsive thrust by a nozzle 28.

Fuel is supplied to the afterburner 27 from a fuel tank shown schematically at 30. FUel may be pumped from the tank 30 either through conduit 32 or conduit 34. A main fuel pump 42 driven by the engine rotor is provided to pump fuel from the fuel tank 30 through the conduit 34, and a high pressure augmentor fuel pump 38, also driven by the engine rotor, is provided to pump fuel from the tank 30 through conduit 32 and an inlet valve 36 and thence through a check valve 40. A flow mixing selector valve 45, to be subsequently described in full detail, is provided to receive fuel from the main fuel pump 42 through conduit 44 and from the augmentor fuel pump 38 through conduit 43. Fuel exits from the flow mixing selector valve through conduit 58 whereupon the fuel is directed to an augmentor fuel control 60. The augmentor fuel control 60 includes a metering valve, not shown, for scheduling fuel flow through conduit 62 to the afterburners 27.

A portion of the fuel from the main fuel pump 42 is diverted through conduit 46 to the main fuel control shown generally at 48. The main fuel control 48 also includes a metering valve, not shown, for scheduling the flow of fuel through conduit 47 to the combustor 24. The metering valves of both the main fuel control and the augmentor fuel control are made responsive primarily to a pilot control lever 50, and are also responsive to various parameters such as speed, temperature and pressure in order to optimize engine performance.

Operation of the flow mixing selector valve 45 is controlled by fluidic signals or servo fluid from the main fuel control 48 transmitted through conduits 52 and 54 and servo reference fluid is provided from the main fuel control through conduit 56. Servo reference fluid is generally at a lower pressure than the fluidic signals through conduits 52 and 54 and provides a predictable back pressure opposing the hydraulic forces of the signals supplied through conduits 52 and 54. Scheduling of signal fluid from the main fuel control through conduits 52 and 54 may be accomplished by means of the pilot controlled lever 50 or by combustor 24 air pressure applied to the main fuel control through conduit 61.

The pressure of the signal fluid or servo fluid may typically approximate 400 psi whereas the pressure of the servo reference fluid may typically approximate 200 psi. Fuel from the high pressure augmentor pump may be pressurized to 1000 psi whereas fuel from the low pressure main pump may be pressurized to 500 psi. It is to be appreciated that the low pressure of the main pump fuel is still substantially higher than the pressure of the servo reference fluid.

Turning now to FIG. 2, there is shown in full detail the internal mechanism of the flow mixing selector valve 45. The flow mixing selector valve position is shown for the normal high altitude cruise condition where fuel from the main fuel pump 42 is sufficient to supply both the combustor 24 and the afterburner 27. During normal high altitude cruise, fuel from the main fuel pump 42 enters the mixing valve 45 through the conduit 44, whereupon it passes through a check valve shown generally at 64, and thence through the outlet conduit 58. The check valve 64 comprises a valve piston 66 translatably disposed within a cylindrical chamber 68 such that engagement of the underlying surface of the valve piston 66 with a radially inwardly directed annular lip 72 at the bottom of the cylindrical chamber operates to block the flow of fluid through the check valve 64. Resilient means, such as a spring 70, are provided to maintain the valve piston 66 in sealing engagement with the annular lip 72 in the absence of overwhelming fuel pressure from the main fuel pump.

During normal high altitude cruise, high pressure fuel from the augmentor fuel pump 38 is blocked from the outlet conduit 58 by means of a throttling valve shown generally at 73. The throttling valve includes a valve piston 74 disposed for axial translation along the length of a cylindrical sleeve 82. The valve piston 74 is generally hollow, having an inlet port 76 communicating with a multiplicity of windows 78 spaced about the circumferential surface thereof. The inlet port 76 may be of large size communicating with a generally hollow, cup shaped throttling valve of the type having a cylindrical side wall 75 formed integral with a solid bottom disc 77. ALthough the valve piston 74 has been described as including a multiplicity of windows 78, it would be also satisfactory to provide only a single window within the valve housing. It can be seen that the window includes an initial portion with diverging sides and an adjacent portion with parallel sides. The window herein described is conventional, and although preferred for the purposes of this invention, it is by no means an essential requirement, and other window configurations could alternatively be utilized.

The valve sleeve 82 includes an annular outlet port 84 for communication with the valve windows 78 upon downward translation of the valve piston 74. A second piston 90, coaxially aligned with the valve piston 74, is maintained for axial translation with the valve piston by means of an interconnecting rod 86. Piston 90 is maintained for axial translation within a cylindrical chamber 91, the vertical limit of which is defined by a radially inwardly extending, annular flange 88. Fluidic sealing between the annular flange 88 and the interconnecting rod 86 is maintained by a conventional O-ring seal 89 disposed therebetween. Resilient means in the nature of a spring 92 are provided for engagement with he underlying surface of piston 90 so as to urge both piston 90 and the throttling valve piston 74 upward into the closed position.

A cutoff valve shown generally at 94 is provided to block the flow of fuel from the main fuel pump through conduit 44. The cutoff valve 94 includes a valve piston 96 disposed for axial translation along a cylindrical chamber 98. A second piston 102, in co-axial alignment with the valve piston 96, is provided for axial translation with the valve piston 96, is provided for axial translation with the valve piston 96. Fixed connection between the valve piston 96 and the second piston 102 is provided by means of a connecting rod 99 which extends through a radially inwardly extending annular flange 100. Fluidic sealing between the annular flange 100 and the connecting rod 99 is provided by means of a conventional O-ring seal 101. Resilient means in the nature of a spring 104 engages the underlying surface of piston 102 urging both the second piston 102 and the cutoff valve piston 96 upward into the closed position. A bleed port 97 is provided through the valve piston 96 in order to equalize pressures on both sides of the piston during valve translation. A conduit 126 interconnects that portion of the chamber underlying the second piston 102 with the servo reference conduit 56.

A pilot valve for controlling the position of the throttling valve 73 is shown generally at 110. The pilot valve 110 includes two co-axially spaced apart pistons 112 and 114 disposed for axial translation within a cylindrical chamber 118. The valve pistons 112 and 114 are maintained in fixed axially spaced relation by means of an interconnecting rod 116. Resilient means such as a spring 120 is provided to resiliently engage that surface of the piston 114 opposing the connecting rod 116. A conduit 122 interconnects the main fuel pump conduit 44 with the cylindrical chamber 118 and a second conduit 124 axially spaced from the first conduit 122 interconnects the cylindrical chamber 118 with that part of the chamber 91 which overlies the piston 90. Conduit 111 connects the servo reference conduit 56 by way of conduit 126 with the cylindrical chamber 118 and is axially spaced along the cylindrical chamber 118 intermediate conduit 124 and the end of the chamber at conduit 54. The length of the interconnecting rod 116 is selected such that when the pistons 112, 114 are in the extreme position shown, flow communication is established between the conduits 111 and 124. Translation of the co-axial pistons 112, 114 in the direction of the spring 120 compression operates to block the passage of fluid from conduit 111 to conduit 124 and further operates to establish flow communication between conduits 122 and 124.

Conduit 52 communicates with that portion of the cylindrical chamber 98 intermediate the overlying surface of the piston 102 and the underlying surface of the annular flange 100 such that the introduction of a fluidic signal or servo fluid from the main fuel control operates to translate the piston 102 downward, compressing the spring 104 and opening the cutoff valve piston 96. Conduit 52 further includes an orifice 103 in order to dampen the rate of backflow to the fuel control 48 when the fluid signal is removed.

Conduit 54 communicates with that surface of the piston 112 opposing the connecting rod 116 such that the introduction of a fluidic signal from the main fuel control operates to axially translate the connected pistons 112 and 114 in the direction of the spring 120 compression, thereby blocking the flow from conduit 111 to conduit 124. Conduit 124 also includes an orifice 123 in order to dampen the rate of flow from the main fuel pump through the conduit when the signal fluid is switched from conduit 54 as will be made more obvious from the following discussion.

The flowing mixing selector valve 45 operates as follows. During normal high altitude cruise, the fuel flow from the main fuel pump 42 is sufficient to supply both the combustor 24 and the afterburner 27 and the high pressure augmentor fuel pump may be turned off. For such a flight condition, a high pressure fluidic signal from the main fuel control 48 is maintained in conduit 52 keeping the cutoff valve piston 96 in the open position as shown in the drawing. A low pressure fluidic signal is applied to the conduit 54, thereby allowing the spring 120 to fully expand, maintaining the spaced apart pistons 112, 114 in the extreme position shown in the drawing. Although not preferred, it would be possible to entirely eliminate the low pressure fluid. When the pilot valve pistons 112, 114 occupy the positions shown, flow connection is established from conduit 111 to conduit 124 and low pressure servo reference fluid from the main fuel control 48 flows from conduit 111 to conduit 124 filling that portion of the cylindrical chamber 91 overlying the piston 90. The pressure of the servo reference fluid is also admitted to that portion of cylindrical chamber 91 underlying piston 90 effecting a fluidic pressure balance. This pressure balance allows spring 92 to become fully expanded, so as to close off the throttling valve 73 and block the flow of fuel from the augmentor fuel pump 38. The pressure of fuel from the main fuel pump 42 applied via conduit 44 to check valve 64 is sufficient to effect a compression of spring 70, thereby opening the check valve 64, permitting the main pump fuel to flow to the afterburner 27.

However, during takeoff and low altitude climb, the aircraft combustor operates in a high atmospheric pressure regime where high fuel flows are demanded. During takeoff and climb fuel flow from the main fuel pump becomes inadequate to supply both the combustor 24 and afterburner 27. High pressure fuel from the augmentor fuel pump 38 is required to sustain the afterburner 27. However, too rapid an introduction of high pressure fuel will result in undesirable stresses within the system. In extreme cases, loss of thrust can occur due to fuel flow surges caused by fuel pressure transients. Equipment and conduits downstream from the high pressure augmentor fuel pump are sensitive to high fluidic pressure changes precipitated by the rapid opening and closing of a high pressure pump inlet valve. Such a rapid changing of pressures results in the "water hammer effect" previously discussed which can prematurely damage system components. The flow mixing selector valve 45 eliminates this "water hammer effect" by providing a brief transition period wherein the high pressure fuel is gradually commingled with the low pressure fuel in ever increasing proportion until the low pressure fuel can be entirely cut off. Thus, a nearly constant and low flow rate of change is achieved for all conditions of flow and pressure.

Switching from the low pressure main fuel pump to the high pressure augmentor fuel pump is initiated in the following manner. Actuation of the pilot control lever 50 or an increase in the pressure within the combustor 24 operates a conventional servo valve mechanism (not shown) within the main fuel control 48 so as to switch the high pressure fluidic signal of conduit 52 to conduit 54. Simultaneously, the low pressure signal of conduit 54 is switched to conduit 52. Reducing the fluidic pressure operating on the overlying surface of piston 102 permits an expansion of spring 104 gradually translating the cutoff valve piston 96 axially upward, a distance B and C, into the closed position. The translation of the cutoff valve piston 96 is dampened by the coaction of the spring 104 and the orifice 103 through which the high pressure signal fluid is vented. The translation of cutoff valve 96 is so dampened that the time required to traverse the distance B alone is greater than that required to fully open valve 73, the opening of which is described below.

Introduction of a high pressure fluidic signal on the head of piston 112 operates to translate the attached pistons 112, 114 in the direction of spring 120 compression. As the piston 112 translates, the flow of low pressure servo reference fluid from conduit 111 to conduit 124 is blocked by piston 112. At the same time, the piston 114 operates to connect conduit 122 to conduit 124, supplying low pressure main pump fuel to that portion of the cylindrical chamber 91 overlying the piston 90. The low pressure main pump fuel is reduced in velocity by orifice 123 to gradually translate the piston 90 downward, compressing the spring 92. The throttling valve piston is correspondingly translated downward whereupon the apex of the windows 78 cross over the edge of the annular outlet port 84, introducing high pressure augmentor pump fuel into the conduit 58. This flow effectively reduces and replaces an equal amount of flow from the low pressure main pump fuel supply as the total discharge flow is limited to a constant value by the downstream augmentor fuel control 60. As the throttling valve piston 74 continues downward, the windows 78 move into registration with the annular outlet port 84 increasing the flow of high pressure fuel into the conduit 58. The high pressure augmentor pump discharge fuel in conduit 43 is throttled to the lower pressure main pump fuel in the discharge conduit 58 by the augmentor pump flow passing through the windows 78. The high pressure augmentor pump fuel flow gradually replaces the low pressure main pump fuel flow after which the windows open even further and the pressure in conduit 58 begins to increase. When the pressure rise in conduit 58 is sufficient to overcome the main fuel pump pressure less the resilient force of spring 70, the check valve piston 66 sealingly engages the annular lip 72, closing the check valve 64 and cutting off the flow of low pressure main pump fuel. Only after the low pressure main pump fuel flow has been gradually cut back and completely blocked by the introduction of throttled high pressure augmentor fuel flow does the cutoff valve 94 completely close.

Also, it should be noted that as the throttling valve 73 opens, the valve piston 74 must travel distance A before fuel flow is initiated through the valve. THis time delay allows the high pressure augmentor pump to prime and reach full pressure. Pump inlet pressures in a gas turbine engine may have pressure ratios of ten to one or greater. Therefore, pump priming times may vary as between different engines, and in order to provide a smooth transition of flows, the throttling valve 73 would provide a "dead heading" period equal to the longest expected pump priming time.

In order to switch back to the low pressure main pump fuel, the process is reversed. The pilot control lever 50 may be actuated or a reduction in the combustor pressure may operate to switch the high pressure signal fluid from conduit 54 back to conduit 52. A reduction in fluid pressure operating against the head of piston 112 effects an expansion of spring 120 translating the attached pistons 112, 114 toward the position shown in he drawing. Main pump fuel pressure is cut off from the chamber 91 and low pressure servo reference fluid is restored by interconnecting conduits 111 and 124. The main pump fuel slowly bleeds through orifice 123 and becomes inadequate to maintain compression of spring 92, whereupon the spring gradually expands, translating the throttling valve piston 74 upward, cutting off the flow of high pressure augmentor pump fuel. Increased signal fluid pressure operating on the overlying surface of piston 102 operates to effect a compression of spring 104, gradually translating the cutoff valve piston 96 downward, opening the cutoff valve 94. At the instant cutoff valve 94 begins to open, the low pressure main fuel pump fuel operates against the check valve. When the fuel pressure in conduit 58 is reduced by the closing of valve 73 to a pressure slightly below the main fuel pump pressure, the main fuel pump pressure then overcomes the compression of spring 70, thereby opening the check valve 64. As can be readily seen, restoration of the valve pistons to the positions shown in FIG. 2 provides only low pressure main pump fuel to the outlet conduit 58.

Although the mixing valve has been described in relation to a gas turbine engine, it is readily understood to have broad application apart from such engines. It may be utilized for any application where requirements demand a near constant flow rate of change when switching between low and high pressure fluids. The near constant flow rate of change during the switching period of the mixing valve of this invention may be provided for all conditions of flow and pressure. Therefore, having above described a preferred embodiment of the invention, though not exhaustive of all possible equivalents, what is desired to be secured by letters patent is claimed below.

What is claimed is:

1. A flow mixing selector valve for switching between high and low pressure fluids while maintaining a near constant flow rate of change comprises:

a valve housing having a first inlet for receiving a high pressure fluid, a second inlet for receiving a low pressure fluid, and an outlet for discharging a fluid;

a low pressure fluid controlled throttling valve disposed intermediate the high pressure inlet and discharge outlet for regulating the flow of high pressure fluid therethrough;

a check valve disposed intermediate the low pressure inlet and discharge outlet for controlling the flow of low pressure fluid therethrough;

a signal fluid controlled cutoff valve disposed intermediate the low pressure inlet and check valve for regulating the flow of low pressure fluid to the check valve, and a signal fluid controlled pilot valve for regulating the flow of the low pressure fluid to the throttling valve for controlling the throttling valve, such that a low pressure fluid discharge from the flow mixing selector valve may be maintained at the mixing valve outlet by directing a signal fluid to he cutoff valve which operates to maintain the cutoff valve in the open position thereby opening the check valve and wherein the mixing valve may be switched to discharge a high pressure fluid from the valve outlet by switching the signal fluid from the cutoff valve to the pilot valve which in turn operates to increase the flow of low pressure fluid to the throttling valve gradually opening the throttling valve and closing the cutoff, allowing a smooth matching of pressures on the discharge conduit, and also allowing subsequent closing of the check valve.

2. The mixing valve of claim 1 wherein:

the throttling valve includes: a first throttling valve piston translatably disposed within a first chamber and fixedly connected to a second piston translatably disposed within a spaced apart, second chamber wherein resilient means urge the throttling and second pistons into he closed position and the introduction of the low pressure fluid into the second chamber operates to urge the throttling and second pistons against the resilient means into the open position;

the cutoff valve includes a third cutoff valve piston translatably disposed within a third chamber and fixedly connected to a fourth piston translatably disposed within a spaced apart fourth chamber wherein resilient means urge the cutoff and fourth pistons into the closed position and the introduction of signal fluid into the fourth chamber operates to urge the cutoff and fourth pistons against the resilient means into the open position; and the pilot valve includes fifth and sixth fixedly connected, spaced apart pistons translatably disposed within a fifth chamber which is in flow communication with the low pressure fluid inlet and the second chamber of the throttling valve wherein resilient means urge the fifth and sixth connected pistons into position, blocking off flow communication between the low pressure fluid inlet and second chamber and the introduction of signal fluid into the fifth chamber operates to urge the fourth and fifth connected pistons against the resilient means, establishing flow communication between the low pressure fluid inlet and second chamber and directing the low pressure fluid to the second chamber.

3. The mixing valve of claim 2 wherein:

the first chamber includes an open ended sleeve disposed therein and having at least one outlet port therethrough in flow communication with the mixing valve outlet;

the throttling valve piston is translatably disposed within the sleeve and includes a generally hollow portion communicating with the high pressure fluid inlet by way of an inlet port through the head of the throttling valve piston and further includes at least one window through a contacting surface of the throttling valve piston for flow communication with the sleeve outlet port when translated thereover.

4. The mixing valve of claim 3 wherein the sidewalls of the throttling valve piston window initially diverge from an apex such that when the throttling valve piston is in the fully closed position, the apex is spaced apart from the sleeve outlet port a predetermined distance, the translation time of which for the throttling valve piston is sufficient to permit the fluid entering the high pressure inlet to reach full pressure.

5. THe mixing valve of claim 2 wherein the check valve includes a seventh piston translatably disposed within a sixth chamber wherein resilient means are provided to urge the seventh piston into sealing engagement with an annular lip extending radially inward from the sidewalls of the sixth chamber and wherein the flow of low pressure fluid is sufficient to urge the sixth piston against the resilient means compressing the resilient means and opening the check valve.

6. The mixing valve of claim 2 wherein an orifice is included in a signal fluid conduit to the fourth chamber of the cutoff valve to dampen the rate of backflow therefrom upon fluid signal removal in order to dampen the translation of the cutoff valve piston such that initial blockage of the low pressure inlet is delayed until complete opening of the throttling valve and wherein a second orifice is included in a low pressure fluid conduit to the second chamber of the throttling valve to reduce the velocity of low pressure fluid exiting from the second chamber upon the application of signal fluid to the pilot valve.

7. The mixing valve of claim 1 wherein:

the high pressure fluid is gas turbine engine fuel received from a high pressure augmentor fuel pump;

the low pressure fluid is gas turbine engine fuel received from a low pressure main fuel pump;

the mixing valve outlet discharges fuel to the afterburners of a gas turbine engine by way of an augmentor fuel control;

the signal fluid is servo fuel received from the main fuel control of a gas turbine engine wherein the flow of signal fluid from the main fuel control is regulated as a function of engine fuel flow demand.

* * * * *